No. 697,629. Patented Apr. 15, 1902.
H. B. KEIPER.
COMBINED GEARING AND CASING THEREFOR.
(Application filed June 10, 1901.)
(No Model.)
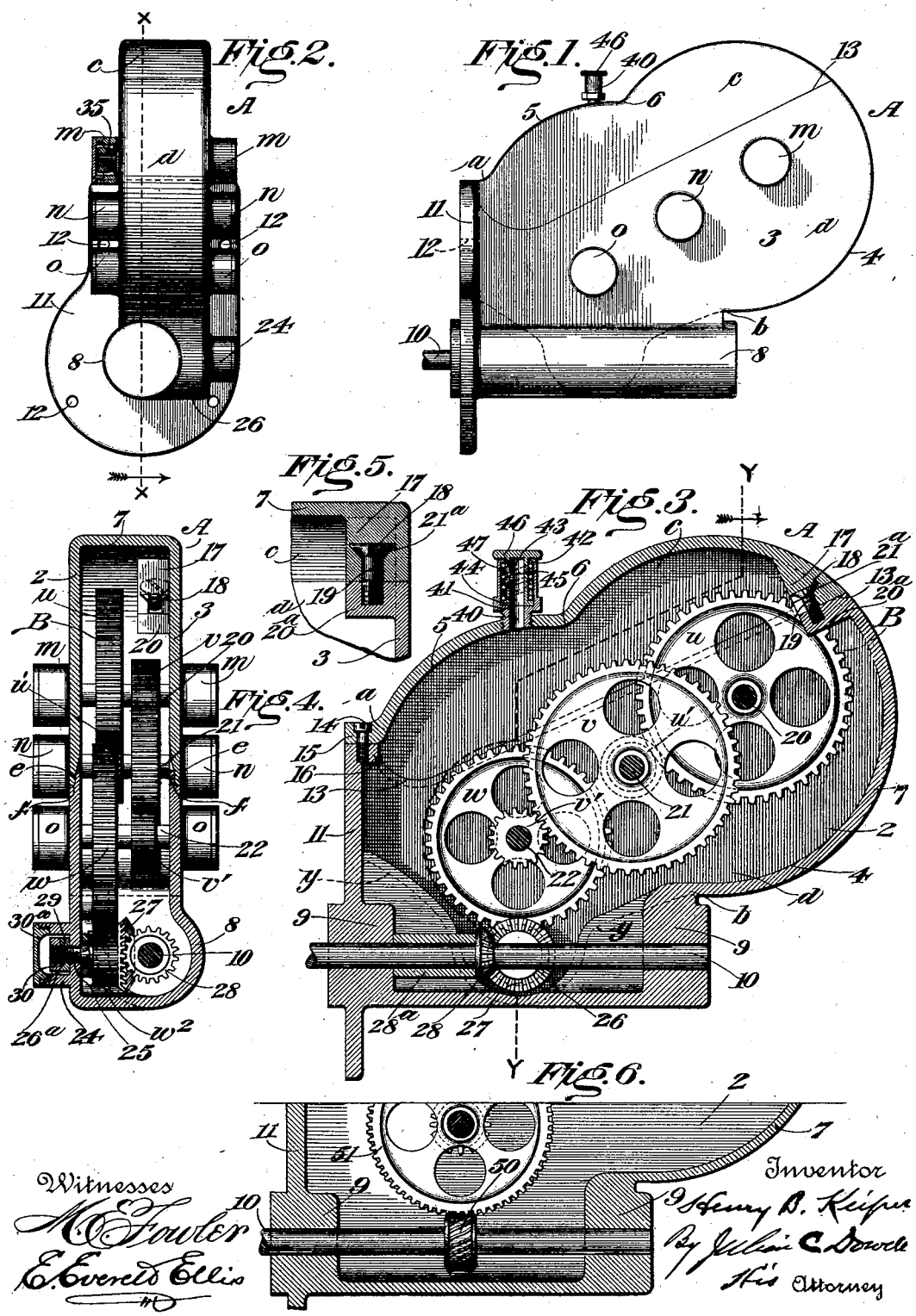
Witnesses
Inventor
Henry B. Keiper
By Julian C. Dowell
His Attorney

UNITED STATES PATENT OFFICE.

HENRY B. KEIPER, OF LANCASTER, PENNSYLVANIA.

COMBINED GEARING AND CASING THEREFOR.

SPECIFICATION forming part of Letters Patent No. 697,629, dated April 15, 1902.

Application filed June 10, 1901. Serial No. 63,983. (No model.)

*To all whom it may concern:*

Be it known that I, HENRY B. KEIPER, a citizen of the United States, residing at Lancaster, in the county of Lancaster and State of Pennsylvania, have invented certain new and useful Improvements in a Combined Gearing and Casing Therefor; and I do hereby declare the following to be a full, clear, and exact description of the invention, such as will enable others skilled in the art to which it appertains to make and use the same.

This invention relates to combined gearing and inclosing casing therefor; and it consists, substantially, in the improvements herein after more particularly described, and pointed out in the claims.

In a former application filed by me on the 6th day of October, 1899, bearing Serial No. 732,763, I have shown and described a certain embodiment of a main driving-shaft, a train of driving-gears therefor parallel therewith and with each other, and a longitudinally-divided inclosing casing in separable parts, in which the said shaft and gears have their bearings, whereby the shaft and gears are cooperatively arranged and housed in compact form, so as to economize both in space consumed and material employed in the construction. In the structure referred to the driving-shaft is formed or provided with a worm, and the train of operating-gears therefor comprises or includes a parallel worm-wheel engaging the worm, said worm-wheel in turn being driven by means of a main driving spur-wheel, engaging a spur-pinion on the axle or shaft thereof. Also in said former structure the inclosing casing for the gearing is divided vertically for practically its whole length, the separable parts or sections thereof being united or joined together by bolts or their equivalent and said parts being also provided with coinciding sockets or bearings for receiving and supporting the journals or ends of the shafts of the several gear-wheels. The said former construction or embodiment possesses many advantages in the art or trade to which the same belongs, particularly as regards the efficiency of the structure combined with its compactness and the light-running and noiseless character and strength and durability thereof; but in order to meet certain demands or requirements of the trade in some instances as well as to render the structure even more compact in form and noiseless in operation I have devised certain important changes or alterations both in the construction and arrangement of the gearing as well as the inclosing casing, all as will be more fully explained hereinafter.

The object of the present invention is therefore to provide a simple and inexpensive light-running gearing combined with an inclosing casing therefor, the whole being assembled in compact form and said gearing being adapted for use in driving or propelling rotary fan-blowers and other devices or machinery in the most rapid and effective manner.

A further object is to simplify and render more secure the fastening between the separable parts or sections comprising the inclosing casing for the gearing and also to lessen or reduce the expense of manufacture of said casing, as well as to render the same very light and strong and devoid of extraneous projections or lugs on the exterior thereof.

A still further object is to provide the inclosing casing of an absolutely oil-tight and dust-proof construction, whereby even-running and noiseless operation of the inclosed gearing is secured uninterruptedly and also to provide a stronger and more positive direct driving connection between the operating-gearing and the main shaft driven thereby.

The above and additional objects I attain by means substantially such as are illustrated in the accompanying drawings, wherein—

Figure 1 is a side view of the inclosing casing, indicating the line of division between the separable parts thereof; and Fig. 2 is an end view of Fig. 1 looking toward the left. Fig. 3 is a vertical sectional view of the combined structure on the line $x\ x$ of Fig. 2, the same being somewhat enlarged and indicating very clearly the arrangement or disposition within the inclosing casing of the train of gearing and the main shaft driven or operated thereby. Fig. 4 is a vertical sectional view taken on the line $y\ y$ of Fig. 3 looking toward the right. Fig. 5 is a sectional view in detail to indicate more clearly the interlocking connection or fastening for the upper separable or detachable section or cover of the inclosing casing for the gearing. Fig.

6 is also a sectional view in detail representing a slight modification in the direct connection between the driving-gears and the main shaft operated or driven thereby.

Before proceeding with a more detailed description it may be stated that in the present instance I preferably dispense with the worm and worm-wheel of my former construction referred to (although I can and do employ substantially a similar construction thereto in some instances, as herein shown) and I substitute therefor a beveled pinion mounted on the shaft and engaged and operated by a similar pinion arranged at an angle thereto and in turn operated from the gear-train in the manner herein shown and hereinafter more specifically described. The inclosing casing is provided at the proper points with suitable bearings for the main shaft as well as for the ends or journals of the shafts or axles of the several wheels of the gear-train, and the wheels of said gear-train are all in parallelism, while the form of direct connection between the gear-train and the shaft is such as practically not to exceed the distance between the outermost surfaces or faces of the wheels of said gear-train, thus more perfectly conforming to the desired compactness and economical character of the general structure. The separable parts or sections of the inclosing casing are so arranged or disposed that one of said parts constitutes a removable or detachable cover or lid for enabling access to the gearing to be had, and the other part or section more fully incloses or envelops the gear-train and also serves as a receptacle for catching and retaining all excess of oil or lubricant supplied to the said train and permitting equal distribution of the oil or lubricant to the wheels of the train without discharge or leakage thereof at the sides of the said casing. In the present instance also I preferably provide the bearings for the shafts of the gear-wheels exteriorly of the inclosing casing, although it will be understood that the same may be constructed interiorly of the said casing substantially as in the construction of my former application referred to. Other general features are also employed herein, as will appear from the following description.

Specific reference being had to the accompanying drawings, A represents as a whole the housing or inclosing casing of my present invention, the side pieces 2 and 3 thereof being to a certain extent duplicates or counterparts of each other in that they are each curved or rounded at 4 to conform as closely as possible to the general contour or configuration presented by the inclosed gear-train B within, each of said parts being also curved or rounded on their upper edges at 5, the two curves joining or uniting with each other at a suitable angle at 6. The said side pieces 2 and 3 are connected or joined together integrally by a wall or body portion 7, which, except for the horizontal division of the housing or casing about to be described, is practically or substantially continuous between the points $a$ and $b$ in Figs. 1 and 3, and which wall or body portion follows the general shape or configuration above mentioned with regard to the said side pieces 2 and 3, this also being clearly shown in said Fig. 3. The said side piece 3 is turned outwardly or swelled at the lower part of the casing, as shown at 8, Figs. 1, 2, and 4, forming a straight tubular portion extending longitudinally for a suitable part of the length of the casing, and each end of said longitudinal tubular portion is considerably increased in thickness, as shown at 9, said thickened end portions constituting bearings for the main shaft 10, operated by the gear-train, hereinafter referred to. The innermost end or part of the said casing has an integral plate 11, formed or provided at suitable points with holes or openings 12 for the passage of suitable screws or bolts for attaching or securing the casing and its inclosed gearing to any suitable support for the purpose of operating a fan-blower or any other suitable device or mechanism (not shown) and to which proper connection of the main shaft 10 is made in any desired manner. The said shaft is so housed as to be entirely within the dimensions of the inclosing casing, as shown, excepting only a short extension or projection at one end for connection with the part to be driven, thus rendering the entire structure exceedingly compact and strong.

In order to render the inclosed gearing easily accessible, and also for the purpose of deriving the additional advantages therefrom hereinbefore enumerated, I divide the said inclosing casing, preferably, into two substantially horizontally separable parts or sections $c$ and $d$, the line of separation between the sections being indicated at 13, Figs. 1 and 3, and the corresponding fitting edges of the said parts or sections being rabbeted or flanged at $e$ and $f$, respectively, so as to overlap and form an oil-tight and dust-proof joint between the two. The said upper part or section $c$ thus constitutes a removable or detachable lid or cover for the lower part or section $d$, and I may employ any suitable device or means for the purpose of securing said lid or cover in place. Preferably I employ fastening-screws 14, (one or more,) passing through the inner flanged end 15 of said cover-section and entering suitable openings therefor in a flange 16 at the upper edge of the attaching-plate 11, hereinbefore referred to. (See Fig. 3.) As an additional fastening, however, I also construct the interior of the cover-section $c$ at one side with an integral lug 17, (see Fig. 5,) having therein a notch 18, in which is received a pin or screw 19, fitted in an integral lug 20$^a$ on the corresponding side of casing-section $d$ within. Said pin or screw has a head 21$^a$ overlapping the edges of the said notch at either side thereof, and thus by fitting the cover-section $c$ of the casing in place in the manner shown and then inserting the screws 14 it will be impossible to remove the cover-section without first removing the screws 14 and then moving or sliding said section outwardly substantially in the direction of the divisional line 13 between the two said separable sections $c$ and $d$. It will thus be seen that a very secure fastening is derived capable of withstanding all strain due to any rough handling of the structure in use or from other causes. The said casing-section $d$ is formed at the sides 2 and 3 thereof with coinciding external sockets or bearings $m$ $n$ $o$ for receiving and supporting the ends or journals of the shafts 20, 21, and 22 of the spur gear-wheels $u$ $v$ $w$, respectively, the said shafts and gear-wheels being compactly arranged and closely housed in the inclosing casing thus constructed and disposed. As herein shown, a multiplying-gearing is preferably employed, so as to impart a very high rate of speed to the shaft 10, power being applied in any suitable manner to shaft 20, as by means of a handle or crank, (not shown,) and it will be seen that the wheel $u$ gears with a pinion $u'$ on the shaft 21 of wheel $v$, while the said wheel $v$ engages in like manner with a similar pinion $v'$ on the shaft 22 of the third or last gear-wheel $w$. In this way the said wheel $w$ is made to rotate at a greatly-increased speed, as is evident. It may here be stated that any other suitable character of gearing may be employed without departing from the spirit or scope of the invention. The said gear-wheel $w$ engages in turn with a pinion $w^2$, turning indirectly on a partially-threaded stub-shaft 25, arranged at right angles to shaft 10 at substantially the middle portion thereof, the said stub-shaft being stationary in a socket or hollow lug 24, formed integrally with the side piece 2 of the said inclosing casing A, the said side piece 2 being curved inwardly at its lower edge from each end of said casing, as indicated at $y$ $y$, Fig. 3, forming or leaving the central pendent portion 26, from which the said integral socket or lug 24 projects at right angles, as shown. The said pinion $w^2$ is splined (see dotted lines, Fig. 4) to the hub $26^a$ of a toothed beveled gear-wheel 27, which engages with a similar beveled pinion 28 on shaft 10, and it is apparent that on operating the gear-train the said shaft will be rapidly driven or rotated by which to operate any suitable device properly connecting therewith. It is evident that instead of employing toothed or spur gearing, such as I have herein preferred to show, I may employ suitable friction-gearing, if so desired. Located on the shaft 10 intermediate the pinion 28 and one of the bearings for said shaft is a sleeve $28^a$, which serves to strengthen the shaft as well as to relieve said pinion of some of the strain of endwise thrust produced thereon in the operation of the gear-train.

Screwing on the stub-shaft 25, exteriorly of the side 2 of the casing, is a tightening-nut 29 and a jam-nut 30, while the hollow lug 24 is closed by a cap $30^a$.

Preferably, though not essentially, each of the shafts of the gear-train may be mounted or supported in any suitable antifriction-bearings, as indicated at 35 in Fig. 2. Also, as hereinbefore mentioned, the coinciding bearing-sockets for said gear-shafts may be located entirely within the casing instead of exteriorly thereof, as is clearly obvious.

In order that the engaging portion of the wheels of the gear-train, as well as the direct connection between such train and shaft 10, may be constantly supplied with an oil or lubricant by which to reduce noise and friction between the parts, I preferably provide the uppermost or removable cover-section $c$ of the inclosing casing with any preferred means for the introduction of such lubricant to the interior of said casing. Thus screwing or otherwise fitting into an opening in the said cover-section $c$ is a short tube 40, having at or near its lower end an inner flange 41 and formed at its upper end with an inturned flange 42, and working in this tube is an inner short tube 43, having a base-flange 44, fitting the interior of said tube 40, the said inner tube 43 being formed with an opening 45 in its side and provided at its upper end with a cap-piece or button 46 for manipulation thereof. Surrounding the inner tube 43 and having its bearing between the base-flange 44 thereof and the inturned flange 42 of said outer tube 40 is a spring 47, which normally presses or forces the inner tube downwardly, so as to keep the opening 45 therein closed or concealed by said outer tube; but by taking hold of the button 46 and pulling the inner tube upwardly against the tension or action of said spring the said opening 45 is thus brought beyond the upper end of outer tube 40, and oil or other lubricant can be then introduced into the casing through such opening, after which by releasing the hold on said inner tube the latter is again forced inwardly by the spring and the opening 45 thus again closed. Any suitable quality of oil or lubricant can be introduced from time to time, which by falling onto the gear-train serves to keep the wheels well oiled. The lubricant also flows to the bottom of the pendent and tubular portions of the inclosing casing, thus serving also to lubricate the direct connection between the gear-train and the shaft 10, driven thereby. The wheels in their rotation serve also to scatter the lubricant about within the casing, and it is evident that the friction and the wear between the parts are thus reduced to a minimum. As before stated, no leakage of the lubricant from the casing can take place.

In the modification of my present invention (see Fig. 6) I have shown the shaft 10 as provided with a very short worm 50, which is engaged by worm-wheel 51, constituting a part of the gear-train within the casing A. As is evident, this embodiment may also be employed with the present form of inclosing casing, if so desired. Indeed, as before stated, I am not limited to any particular character or arrangement of gear-train as long as the wheels and connections between the same are substantially in parallelism by which to derive the desired compactness thereof. It will also be understood that immaterial changes may be made in the details of construction of the inclosing casing without departing from the spirit of my present invention.

From the foregoing description, taken in connection with the accompanying illustrations, it will be seen that my present invention comprises a portable structure which is easily carried about for the purpose of being attached or mounted in position for use and also that said structure while being strong and durable is composed of comparatively few parts so assembled together as to occupy but small space either in use or in shipment or transportation.

It will further be seen that easy and ready access to the parts is had at all times and that said parts can be quickly repaired or replaced when necessary.

By properly adjusting the screw 19 it will be seen that the cover-section $c$ of the casing may be made to fit the section $d$ more or less tightly, and thus can said section $c$ be rendered more or less easily removable.

Having thus fully described my invention, what I claim as new, and desire to secure by Letters Patent of the United States, is—

1. A gear-train-inclosing casing constructed in separable hollow sections of unequal sizes secured together so as to form an inclosure having an unobstructed space therein to receive a train of gears, one of said sections being removable to permit access to but without disturbing the inclosed gearing, in combination with a train of spur-wheels inclosed in said casing, bearings for said wheels at opposite sides of the lower or larger section of the casing, a shaft journaled parallel with said gear-train, and a gear-wheel on said shaft in gear with said gear-train.

2. A gear-train-inclosing casing constructed in unequal separable hollow sections, united to form a complete inclosure with unobstructed interior and one of which may be removed to permit access to but without disturbing the gearing inclosed within the casing, in combination with a train of gears having their bearings in opposite sides of the larger section of said casing beyond or below the dividing-line which separates the removable section from said larger inclosing portion, a shaft journaled parallel with said train of gears and a gear-wheel on said shaft in gear with said gear-train.

3. A gear-train-inclosing casing constructed in separable hollow sections of unequal sizes, one of which may be removed without disturbing the arrangement of the gearing inclosed within the casing, and which together form a narrow oblong housing without interior obstructions and adapted to receive a train of gears journaled therein, in combination with a train of gear-wheels inclosed within said casing and having their bearings in opposite sides of the larger section thereof, a shaft journaled within the casing parallel with said train of gears and a gear-wheel on said shaft in gear with said train.

4. A gear-train-inclosing casing constructed in substantially horizontally-divided separable hollow sections of unequal sizes, one lying upon the other edge to edge and removable therefrom to permit access to but without disturbing the gearing inclosed within the casing, in combination with a train of gear-wheels inclosed in the lower larger section, bearings for said train of gears at opposite sides of said lower section, a shaft journaled below said train of gears, and a gear-wheel on said shaft geared to one of the gears of said train.

5. A device or structure of the character herein described, comprising a gear-train, a shaft operated thereby, said train including a beveled gear-wheel, and said shaft having a similar wheel engaged thereby, and an inclosing casing for said parts constructed of two horizontally-divided separable hollow sections secured together edge to edge, one of said sections constituting a cover for the casing, and the other supporting the said gear-train and shaft, said shaft and train of gears having their bearings in and inclosed by said separable sections, substantially as set forth.

6. A device or structure of the character herein described, comprising a gear-train, a shaft operated thereby, and an inclosing casing for said parts constructed of two horizontally-divided separable hollow sections secured together edge to edge, one of said sections constituting a cover for the casing and provided with means for the introduction of a lubricant, and the other section supporting the said gear-train and shaft, said shaft and train of gears having their bearings in and inclosed by said separable sections, substantially as set forth.

7. A device or structure of the character herein described, comprising a gear-train, a shaft operated thereby, said train including a beveled gear, a stub-shaft supported at right angles to said shaft and having a similar rigid gear, said second-named gear being operated from the train, and an inclosing casing for said parts constructed of horizontally-divided separable sections, said shaft and train of gears having their bearings in and inclosed by said separable sections, substantially as set forth.

8. A gear-train casing comprising an inverted-trough-like section, a similar section of greater depth supporting the former and forming therewith a gear-train inclosure complete, a train of gears housed within said casing, bearings for said gears at opposite sides of the casing, a shaft journaled in bearings in the casing, and a gear-wheel on said shaft engaging one of the gears of said train.

9. A device or structure of the character herein described, comprising a gear-train, a shaft operated thereby, said train including a beveled gear-wheel, and said shaft having a similar wheel engaged thereby, and an inclosing casing for said parts constructed of horizontally-divided separable sections, said casing being provided with an integral plate for attachment of the structure to a support, substantially as herein shown.

10. A device or structure of the character herein described, comprising a gear-train, a shaft operated thereby, and an inclosing casing for said parts comprising separable sections, one of said sections having an interior offset, provided with a headed pin, and the other section having an interior lug provided with a slot in which said pin is received, substantially as shown and described.

11. In combination, a gear-train casing composed of hollow sections of unequal sizes mounted one upon the other with their hollow sides confronting and having overlapping abutting edges, a train of gear-wheels housed within said casing, bearings for said wheels at opposite sides of the lower larger section of said casing, a shaft journaled adjacent to said train of gears, and a gear on said shaft engaging one of the gears of said train.

12. A device or structure of the character herein described, comprising a gear-train, a shaft operated thereby, a beveled gear on said shaft and an inclosing casing for said parts constructed of horizontally-divided separable sections, one of said sections constituting a cover or lid, and the other supporting the wheels of the gear-train and having an integral tubular portion supporting said shaft, said latter section also having a hollow pendent portion, and a stub-shaft working therein and provided with a beveled gear engaging the similar gear on the shaft, as set forth.

13. A device or structure of the character herein described, comprising a gear-train, a shaft operated thereby, said train including a beveled gear-wheel, and said shaft having a similar wheel engaged thereby, and an inclosing casing for said parts constructed of horizontally-divided separable portions or sections, one of said sections constituting a cover and provided with a self-closing device for admitting a lubricant, the other section supporting the shaft and the wheels of the train and having an integral attaching-plate, and the two sections having interlocking means for detachably securing them together, as set forth.

14. A gear-train-inclosing casing composed of unequal separable sections of substantially trough-like form divided upon an approximately horizontal plane and secured together so as to provide an unobstructed interior, bearings at opposite sides of the casing for a train of gears, a train of gear-wheels journaled in said bearings, a shaft journaled in bearings formed in the larger section of the casing and a gear-wheel on said shaft engaging a gear of said train.

15. A gear-train casing composed of two separable trough-like sections of unequal sizes mounted one upon the other with their hollow sides confronting, leaving a clear space within to receive a train of gears, in combination with a train of gear-wheels housed within the casing, bearings at opposite sides of the casing for the shafts of said gear-wheels, a shaft extending longitudinally of the casing and a gear-wheel on said shaft engaging one of said train of gears.

In testimony whereof I affix my signature in presence of two witnesses.

HENRY B. KEIPER.

Witnesses:
JOHN B. SLOUGH,
WALTER A. MILLER.